(12) United States Patent
Ong

(10) Patent No.: US 6,285,317 B1
(45) Date of Patent: *Sep. 4, 2001

(54) NAVIGATION SYSTEM WITH THREE-DIMENSIONAL DISPLAY

(75) Inventor: Ping-Wen Ong, Middletown, NJ (US)

(73) Assignee: Lucent Technologies Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/071,480

(22) Filed: May 1, 1998

(51) Int. Cl.[7] ....................................... H03D 1/00
(52) U.S. Cl. ....................... 342/357.13; 701/211; 340/995
(58) Field of Search ................ 342/357.13, 357.09, 342/357.1; 701/211; 340/995

(56) References Cited

U.S. PATENT DOCUMENTS 5,815,411   9/1998   Ellenby et al. .
5,883,739 * 3/1999   Ashihara et al. ................. 359/462
5,959,577 * 9/1999   Fan et al. ........................ 342/357.13

* cited by examiner

*Primary Examiner*—Theodore M. Blum
(74) *Attorney, Agent, or Firm*—Duane, Morris & Heckscher LLP

(57) ABSTRACT

A navigation system for a mobile vehicle includes a vehicle position data generator for generating signals indicating location of the mobile vehicle, and scene information provider which generates information representative of the layouts of local environs at various locations and a display. A real environment scene generator, using position data acquired from the vehicle position data generator, acquires information from the local scene information provider representative of the local scene at the vehicle position indicated by the position data. The real environment scene generator generates location pertinent information which is used by the display to display a scene depicting the locality setting in a three dimensional format. The real environment scene generator also generates direction information which is used to display directions overlaid on the displayed local scene. The displayed scene and overlaid directions are constantly updated to reflect the changing locality as the position of the vehicle changes.

29 Claims, 9 Drawing Sheets

NAVIGATION SYSTEM WITH THREE-DIMENSIONAL DISPLAY

FIELD OF THE INVENTION

The present invention relates to a navigation system for automotive vehicles and, more particularly, to a navigation system which incorporates a three-dimensional display updated with information from a wireless service provider.

BACKGROUND OF THE INVENTION

Electronic navigation and information systems have been implemented in automotive vehicles. These systems alleviate the driver or the passengers of an automotive vehicle from the task of finding the best route to a destination. Such systems are particularly useful in regions unfamiliar to the driver in that it avoids the tedious tasks of map interpretation.

These systems have further been adapted to display the current position and traveling direction of the automotive vehicle in correlation with a map image overlapped on a display screen of a cathode ray tube (CRT) display unit located adjacent the driver's seat of the vehicle so as to further assist the driver in navigation tasks.

In order for such a system to provide the aforementioned navigation services, the system must be oriented to the actual position of the automotive vehicle relative to a road map. The actual position of an automotive vehicle may be determined by using systems such as: (a) the global positioning system (GPS); (b) the LORAN navigation system; (c) an inertia navigation system, e.g., the dead-reckoning system; or (d) a radar-like service such as ranging.

For example, the global positioning system (GPS) determines the position of an automotive vehicle in a global geometrical region through the method of triangularization. Typically, a global positioning system includes a receiver for receiving radio waves transmitted from three or more GPS satellites. The global positioning system determines the position of a reception point where the receivers have received the radio waves, based on quasi-distance data between the GPS satellites and the reception point, including a time offset of the receiver, and positional data of the GPS satellites.

Most modern GPS-based vehicle navigation systems can be divided into two categories: 1) map approach and 2) direction approach. A map approach navigation system displays a street map stored on a local storage device and the position of the vehicle on the map. If the vehicle is moving the map approach system will show the trace of the moving vehicle. As shown in FIG. 1a, the map shows the current position of the vehicle with a circle and an arrow 10 indicating the moving direction. The trailing circles show the trace of the moving vehicle.

The map approach is suited for people who like to see a bird's view of where they are. The map approach can also show the surrounding environment of the current position. The drawbacks of the map approach are: 1) the navigation direction is harder to understand; 2) the map is too complicated for some people; 3) the turn direction (left, right) depends on the moving direction of the vehicle which is confusing when the display shows the vehicle moving downward, e.g., as shown in FIG. 1b, the conventional right-turn arrow 11 looks like a left-turn arrow 12 when it moves downward; and 4) prior art maps display too much detail not relevant to the current driving situation.

A direction approach navigation system uses a simple display and/or audio messages to give driver directions according to the planned route identified by the system for the driver. For example, as shown in FIG. 2a, the system notifies the driver to turn right with arrow 14 at a next intersection which is 0.03 miles away.

Systems using the direction approach give the driver a prompt of what to do next. Drawbacks of this approach include: 1) typically the driver knows nothing about the surrounding environment; and 2) sometimes direction is hard to specify in an easily understood manner, e.g., in a complicated intersection as shown in FIG. 2b.

Furthermore, since these systems solely use local storage devices such as CD-ROM or magnetic hard disks to store the mapping and directional information, up-to-last-minute information is usually not available. This is especially important with respect to road changes, i.e., construction and or traffic conditions.

SUMMARY OF THE INVENTION

The drawbacks of prior art navigation systems are overcome, in accordance with the principles of the invention, by a navigation system which displays a realistic view of the territory ahead and clearly shows the direction to be undertaken by the vehicle. Preferably, the view ahead is three-dimensional. In one embodiment of the invention, the navigation system includes a vehicle position data generator for generating signals indicating the location of the mobile vehicle, and a scene information provider which generates information representative of the layouts of local environs at various locations and a display. A real environment scene generator, using position data acquired from the vehicle position data generator, acquires information from the local scene information provider representative of the local scene at the vehicle position indicated by the position data. The real environment scene generator generates location pertinent information which is used by the display to display a scene depicting the locality setting in a tree dimensional format. The real environment scene generator also generates direction information which is used to display directions overlaid on the displayed local scene. The displayed scene and overlaid directions are constantly updated to reflect the changing locality as the position of the vehicle changes.

A BRIEF DESCRIPTION OF THE DRAWINGS

DETAILED DESCRIPTION OF THE INVENTION

Figure 1A:
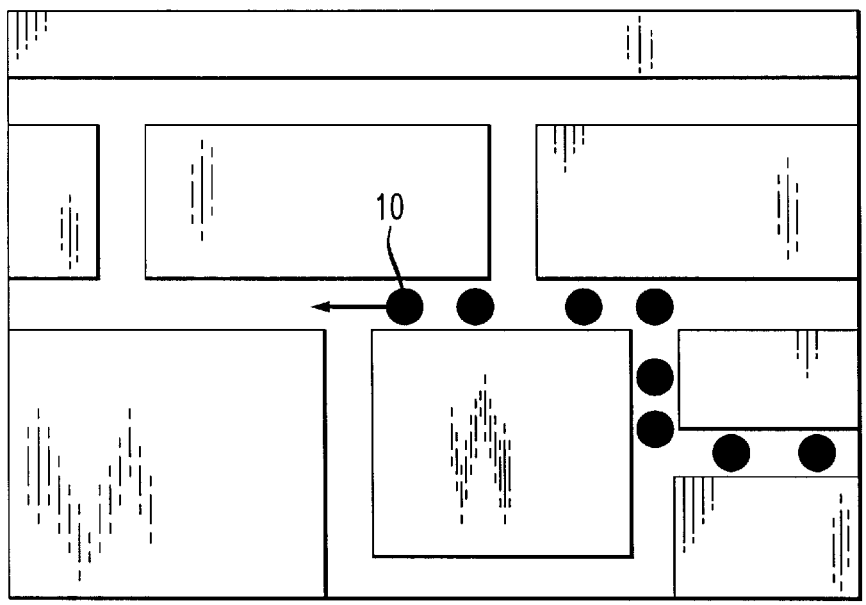
FIG. 1a is a graphical representation of a map approach based GPS system in the prior art.
Figure 1B:
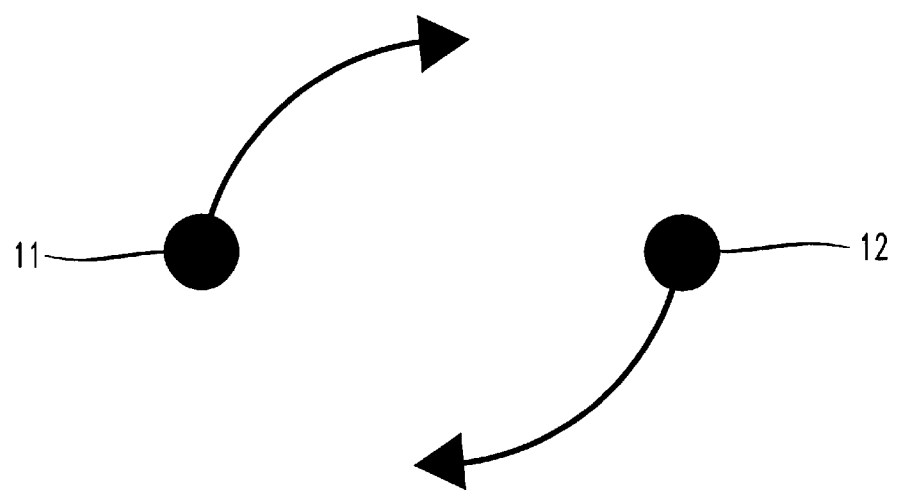
FIG. 1b is a graphical representation of direction arrows used in a map approach based GPS system in the prior art.
Figure 2A:
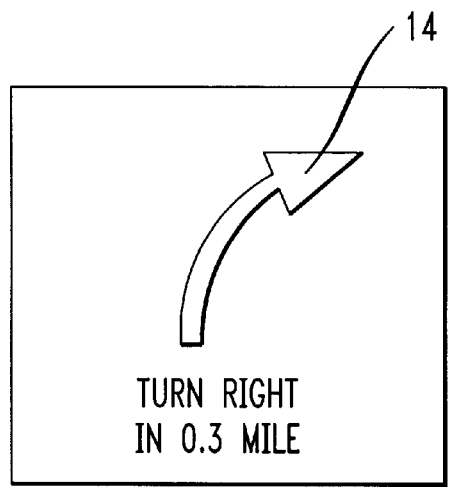
FIG. 2a is a graphical representation of a direction approach based GPS system in the prior art.
Figure 2B:
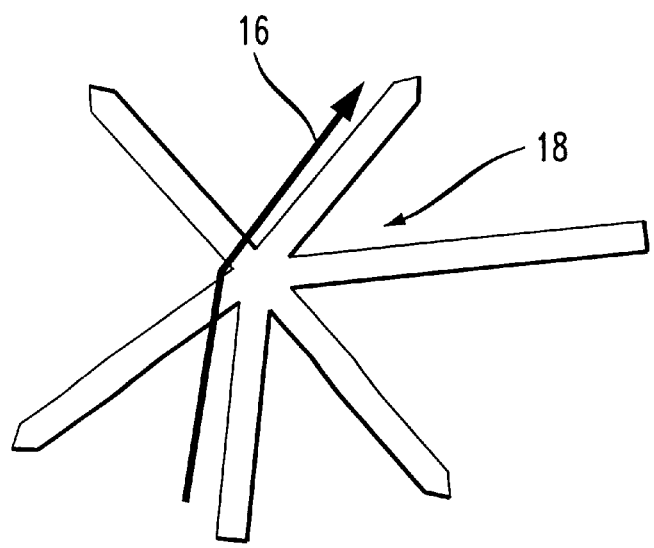
FIG. 2b is a graphical representation of a complicated intersection which is difficult to describe using verbal directions.
Figure 3:
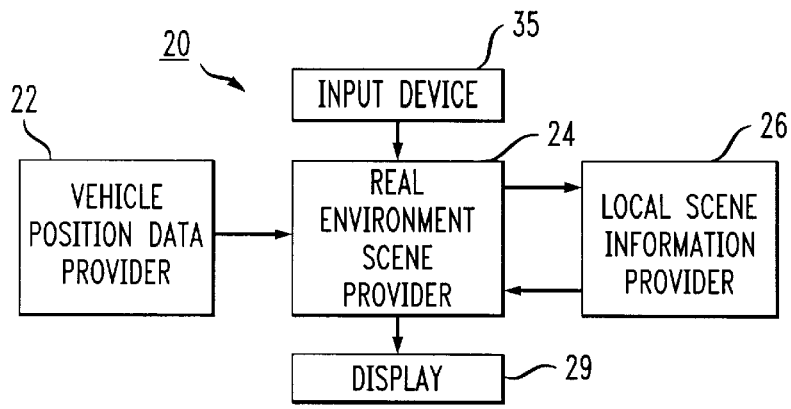
FIG. 3 is an overview block diagram of an embodiment of the navigation system of the present invention.

FIG. 3 illustrates a block diagram of a navigation system in accordance with the present invention, designated generally by reference numeral 20. The system 20 includes a vehicle position data provider 22 for providing real-time vehicle location information. The vehicle position data provider 22 comprises, for example, the receiver portion of a global positioning system (GPS). The GPS receiver provides vehicle position data which is indicative of vehicle position. The GPS is illustrative only and is a preferred embodiment adapted for the implementation of the present invention. The vehicle position data provider 22 is not to be limited to the aforementioned GPS, but may rather incorporate other known means for providing vehicle position data such as LORAN, Dead-Reckoning or radar services.

A local scene information provider 26 obtains local scene information which is representative of the layouts or settings of local environs at various locations. A real environment scene provider 24, using the vehicle position data received from the vehicle position data provider 22, acquires information from the local scene information provider 26 pertaining to the layout or setting of the environs at the location indicated by the vehicle position data provider 22. The real environment scene provider 24 provides location pertinent information for display by display 29, preferably in a three dimensional (3-D) format which depicts the local scene continuously updated by the real-time vehicle location information received from the vehicle position data provider 22. The real environment scene provider 24 also provides directional information in response to commands generated by an on-board input device 35, for display by the display 29. The directional information is preferably displayed in the form of images representing directions, such as arrows for example, overlaid on the display of the local scene.

Figure 4:
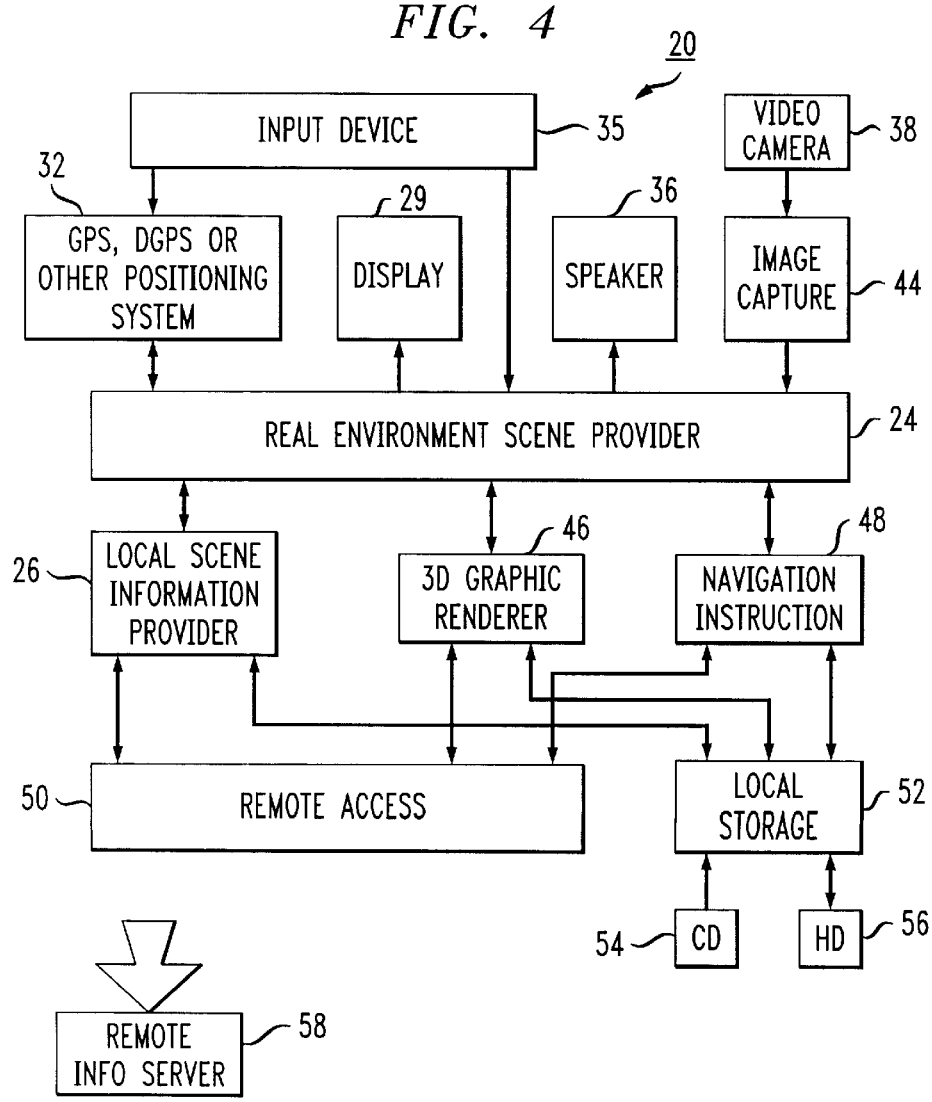
FIG. 4 is a detailed block diagram of an embodiment of the navigation system of the present invention.

Referring now to FIG. 4, there is depicted a more detailed block diagram of the navigation system 20. The real environment scene provider 24, which functions as a central processing unit for the system 20, is coupled directly to the vehicle position data provider 22 which, in the embodiment depicted in FIG. 4, comprises GPS receiver 32. The real environment scene provider 24 operates to coordinate and administer the location, navigational and graphical information provided to the system 20. The operation of the real environment scene provider 24 will be described later herein. The real environment scene provider 24 is also coupled to and provides output to the display 29 and another output device such as a speaker 36. Although the display 29 is, in the embodiment described, a cathode ray tube display, it can also be a liquid crystal display, an active matrix display, or other types of display devices known to those skilled in the art.

Local scene information is obtained by the local scene information provider 26 from a local memory 52 on board the mobile vehicle, a remote access device 50, and/or a video camera 38 adapted for use on board the mobile vehicle. Local scene information obtained by the local scene information provider 26 is provided to the real environment scene provider 24. Local scene information includes, for example, roadway location information, traffic conditions, and other related information; as well as commercial information such as advertisements for, for example, restaurants, gas stations, hotels, motels, parking areas, etc.

The local memory 52 for storing the local scene information on board the mobile vehicle comprises a bulk storage memory device such as a compact disk read-only memory (CD-ROM) 54, a hard disk 56, and/or a read-only memory. The local scene information is obtained by accessing the information stored on the CD-ROM, hard disk or other bulk memory storage device and is provided to the real environment scene provider 24 through a three-dimensional (3D) renderer 46.

The remote access device 50 comprises a transceiver for wireless communication with a remote information server 58. Up-link communication, that is, communication from the mobile unit to the remote information server, includes position information and requests. The position information is preferably a continuous data stream 2×5 bytes×3 Hz=240 bps (3 updates per second). Requests are preferably embodied in burst data streams and include requests for directions, for example, for an address, a location name, a building name, a company name, the nearest gas station, the nearest police station, the nearest hospital, etc; and requests for suggestions such as, for example, restaurants, recreation, accommodations, parking, etc. Since the requests do not require a real time response, they could be sent using spare channel capacity.

Down-link communication, that is, communication from the remote information server to the mobile unit, includes new point and line data and other information. The new point and line data is preferably embodied in a continuous, variable speed data stream in which point data comprises a 2 byte ID field and a 5 byte data field (56 bits); and line data comprises a 2×2 byte ID field, 2×1 byte width, a 2×1 byte height and 1 byte type (for direction) (72 bits); at a rate of 10 points and 10 lines per second ($\geq$1280 bps).

Direction information is also preferably embodied in a continuous, variable speed data stream in which the direction arrow comprises 5 lines or less, or 5×72=360 bps. It is likely that only the new direction line need be transmitted. Therefore, the data rate could be as low as 1 line per second or 72 bps.

Figure 9A:
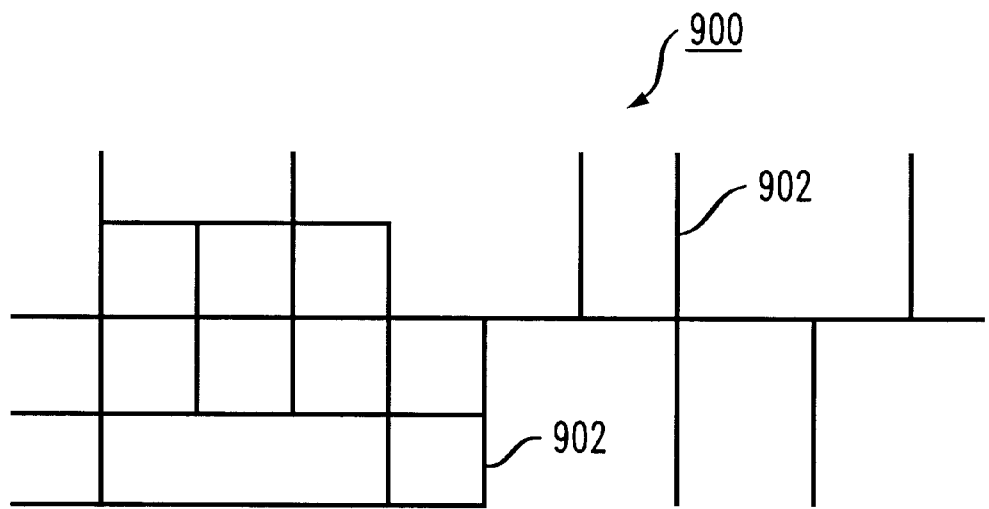
FIGS. 9A, 9B, 9C, 9D, 9E and 9F are schematic representations of street maps depicting how the working set of data changes as a result of movement of the mobile user.
Figure 9B:
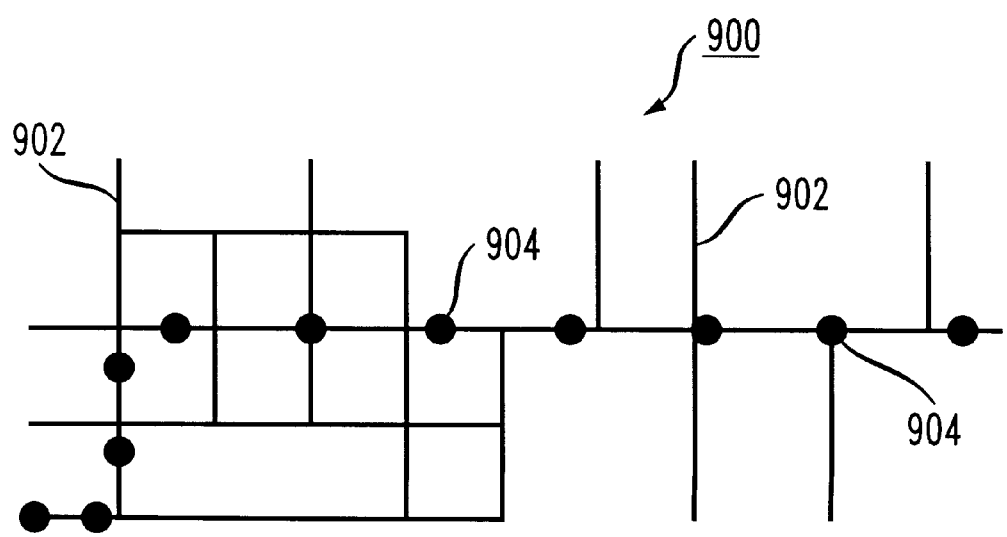
Figure 9C:
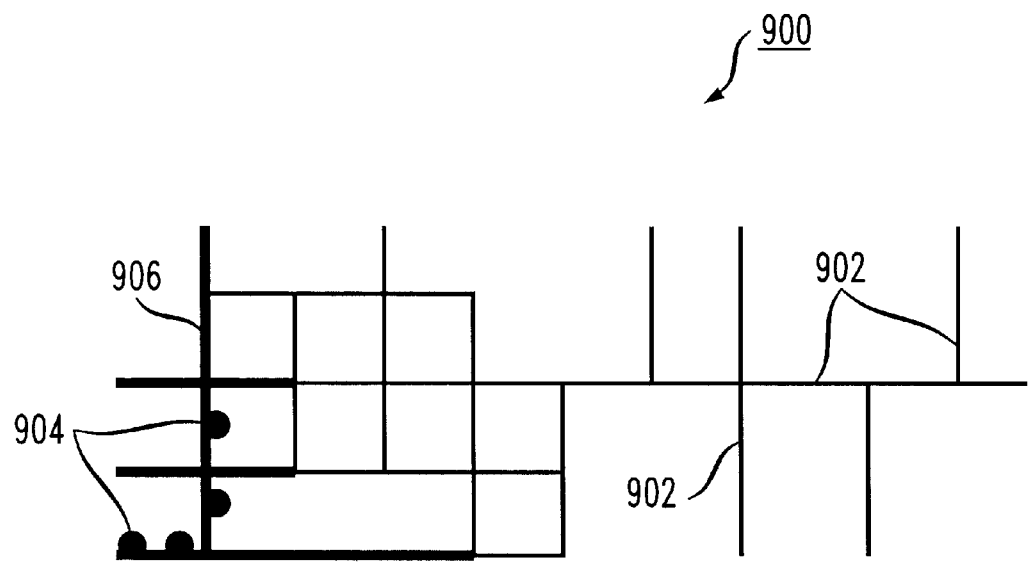
Figure 9D:
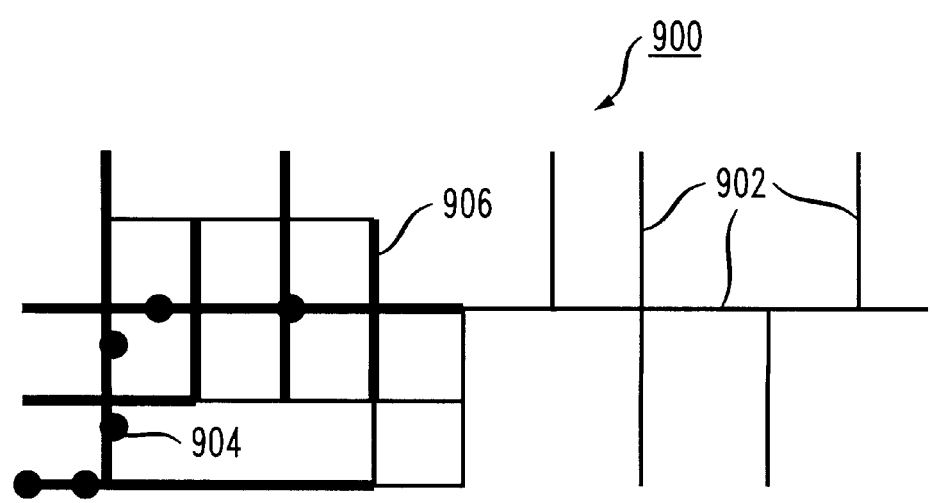
Figure 9E:
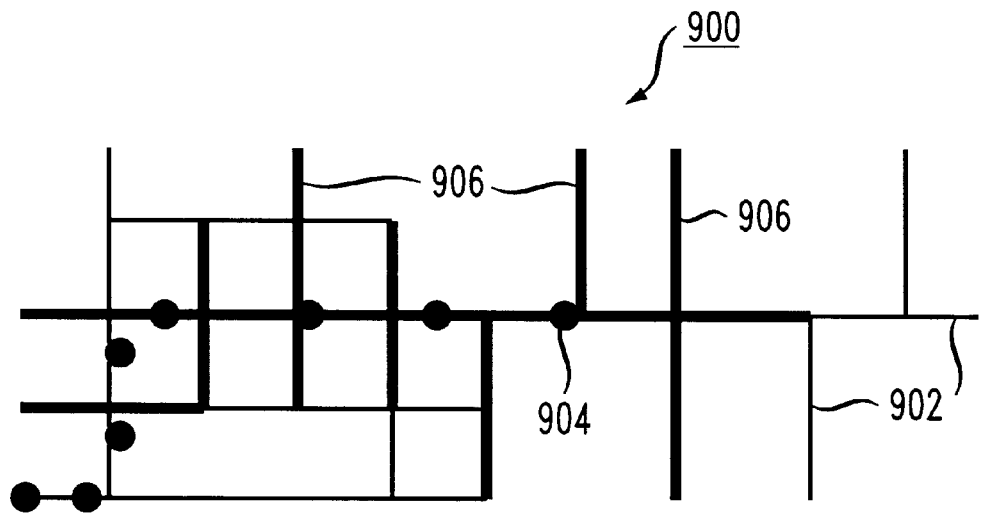
Figure 9F:
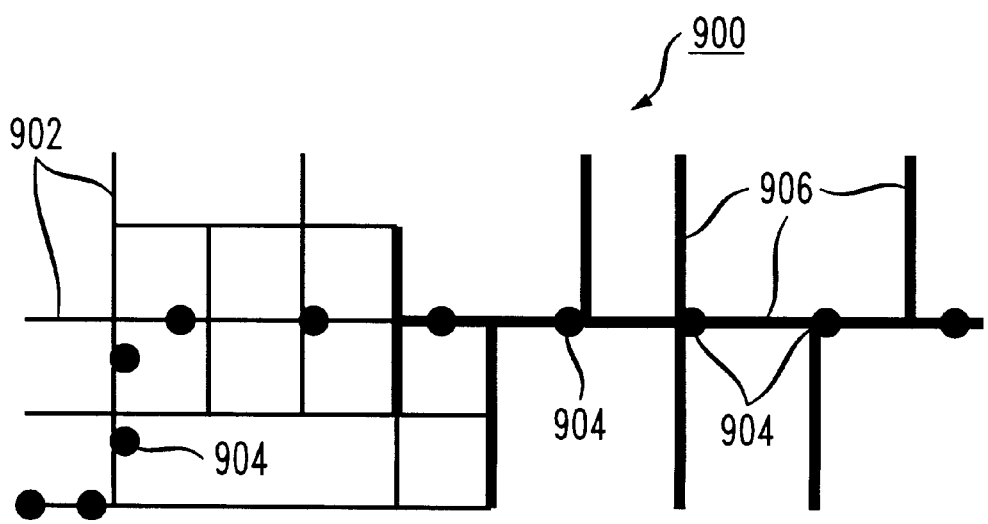

The remote information server 58 keeps a working set of data for every connected mobile user. This working set includes the trace of the mobile user, the points and lines already sent to the mobile user, and other local information sent to the user. Depending on the driving pattern of the mobile user, the server modifies the working set accordingly; adding new points and lines and deleting old points and lines which are not going to be used in the near future. For example, referring to FIG. 9A, there is schematically shown a street map, generally referred to as 900, showing streets referred to as 902. In FIG. 9B, trace points 904 are added to the street map 900. FIGS. 9C, 9D, 9E and 9F depict how the working set changes due to the movement of the mobile user. The streets in the working set are depicted as thicker line segments and referred to as 906. Different criteria can be used to determine which lines and points to keep. For example, keeping everything, if the resources are available; or keeping points and lines within a certain distance, for example 500 meters; or keeping points and lines within a certain travelling distance, for example 500 meters. The remote access device 50 is additionally linked to the three-dimensional graphic renderer 46 which is connected to the real environment scene provider 24. The three dimensional graphic renderer 46 is further coupled to local storage memory 52.

Directional information in the form of navigation instructions 48 are provided from both the remote access device 50 and local storage memory 52 to the real environment scene provider 24. Real-time navigational information from the remote access device 50, for example, such as certain road closings would supplement standardized general routes stored in local storage 52. The input device 35, which is coupled to the GPS receiver 32 and the real environment scene provider 24, enables driver input into the system 20, e.g., it enables a driver to designate a destination while viewing the display 29 or input a desired traveling route. Although the input device 35 is a keyboard in the embodiment described, it could also be a touch panel implemented on the screen of the display 29 wherein the touch panel utilizes light-emitting diodes and light-receiving elements, or a speech recognition device or any combination thereof. Local storage 52 is preferably CD-ROM (compact disc read only memory) 54 and/or a hard disk 56. The CD-ROM 54 is adapted to store road map information classified in accordance with selected geographical regions.

Figure 5:
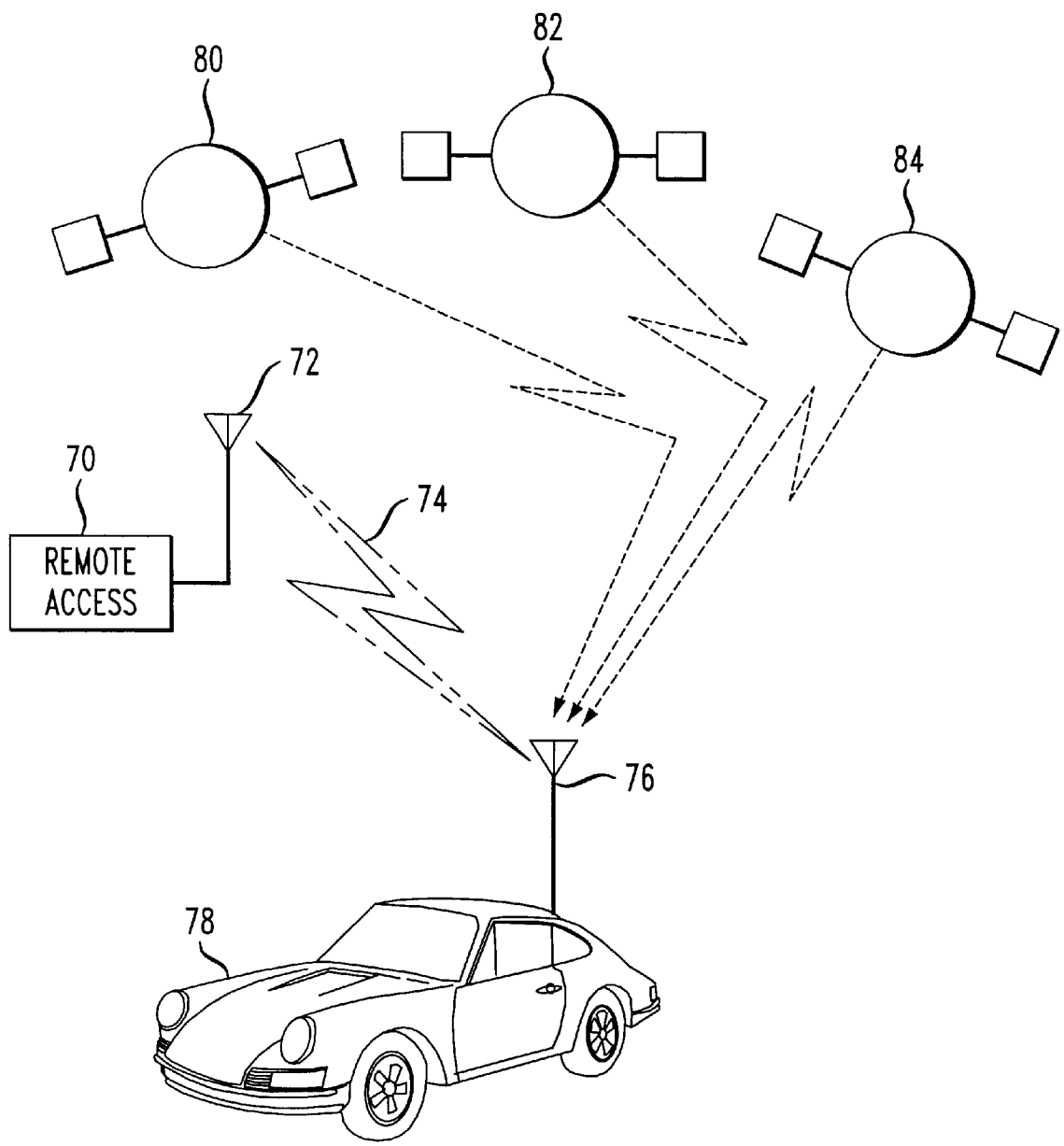
FIG. 5 illustrates a vehicle equipped with an on-board GPS receiver in communication with a remote access and GPS navigational satellites.

Referring now to FIG. 5, the global positioning system receiver 32, disposed in a vehicle 78, receives positioning signals via on board vehicle antenna 76, from GPS satellites 80, 82 and 84 so as to enable the approximation of the actual position of the automotive vehicle. An antenna placement and mounting structure is desirable which provides for both simple and easy mounting and removal, while concurrently maximizing signal reception and quality.

Preferably, the system 20 is coupled to both a direction sensor (not shown) for detecting the direction of travel of the automotive vehicle, and a distance sensor (not shown) for measuring the traveling distance of the automotive vehicle to assist the GPS 32 in the approximation of the actual position of the automotive vehicle. A remote access controller 70 further provides information signals via antenna 72 and signal 74 to the vehicle's antenna 76. The embodiments of the present invention illustrated in FIGS. 7 and 8 utilize "wireless" communications for the transfer of high speed serial data between assemblies. The number of methods for wireless transmission are only limited by the required bandwidth of the serial link. Any form of wireless communication may be utilized that has the necessary bandwidth for at least one GPS of digital data transmission, preferably in the microwave region. When bandwidth is limited, a plurality of serial links may be utilized.

In operation, the system 20 through the real environment scene provider 24 obtains location information from the on-board GPS receiver 32. That location information is synchronized with information obtained from the remote information server 58 and/or local storage 52. The combined location information is used to create a three-dimensional image of the location which is then shown on display 29. Alternatively, the driver may choose to see a real-time video representation of the location which is obtained from the video camera 38. Directional information is provided from both the remote information server 58 and the local storage unit 52 and is overlaid upon the location display or video image. The speaker 36 provides audible information to the driver of pending tuns in advance to audibly direct the driver along a route.

Figure 6:
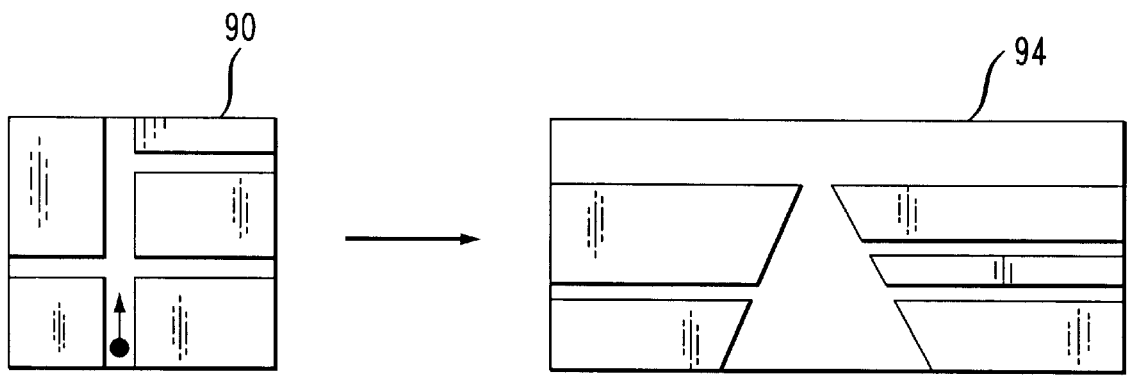
FIG. 6 is a graphical representation of the conversion of a two dimensional to a three dimensional display.
Figure 7:
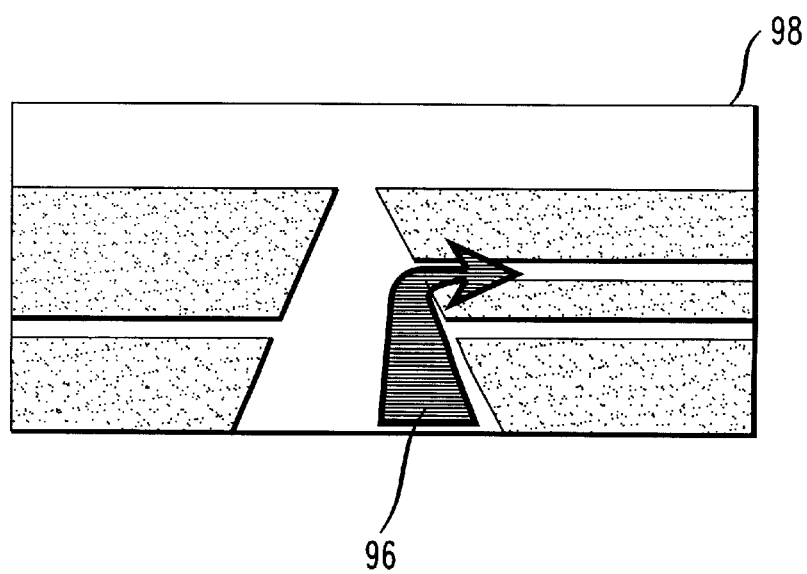
FIG. 7 is a graphical representation of a directional arrow shown overlaid with the three dimensional display.

The three dimensional display of the present invention is depicted in FIGS. 6 and 7. With reference to FIG. 6, the two dimensional map 90 is converted into a three dimensional scene 94. This three dimensional image will essentially match the actual environment in front of the vehicle. The conversion of the two dimensional map into the three dimensional scene can be accomplished by a variety of techniques. By way of background, traditional three-dimensional rendering methods are polygon-based. That is, models that are not directly formed of polygons are converted into polygons for rendering. Thus, for example, each curved surface is converted into an approximation of the surface made of small polygonal facets, usually triangles. Other three dimensional rendering techniques can be used so long as the image is representative of the positional location of the user.

In one embodiment, the rendered three dimensional image only shows the actual roadways and not other objects such as houses, street lights, trees, etc. This provides the user with a clutter free and easily understandable display from which to follow. The road information without other obstructions is provided in one of two ways: 1) via information in the local storage 52 or 2) supplied via remote wireless service provider from the remote information server 58 to the on-board remote access device 50. Since the storage capability on future devices such as DVD-ROM will be substantially larger than current CD-ROMs can provide, it is feasible to store most of the information. However, the fixed storage formats do not provide updating on a real-time basis. The second approach is very attractive, since the local service provider can also put commercial value onto the service. For example, they can highlight a restaurant on the scene who pays them for this service. They can also have virtual billboards in the generated scene for advertisement or even a blimp flying on the sky with company slogans or trademarks. The wireless service carrier is the preferred carrier for this type of information.

Referring now to FIG. 7, the directional information can be overlaid on a three dimensional image 98, to indicate the direction for the driver, as shown by the arrow 96. As shown, the image is much easier to understand than a simple two dimensional image thereby resulting in less driver confusion. The preferred embodiment does not have the problem of the map approach in the changing role of left, right respect to the driving direction on the map, since it is always driver centric, i.e., the display is always from the perspective of the driver. Additionally, the present invention does not suffer from the problems of the direction approach as discussed earlier.

As previously stated, the local scene information provider 26 can obtain local scene information from a video camera adapted for use on board the mobile vehicle. As shown in FIG. 4, the video camera 38 is coupled to the real environment scene provider 24 through an image capture device 44. The video camera 38 and the image capture device 44 are located on board the mobile vehicle to capture the real scene image for display with the direction overlay. This approach provides the driver with a realistic depiction of the actual location. The video camera should be calibrated to the system to accurately map the street to the scene image. For example, as shown in FIG. 7, the direction information is placed on top of the image. The calibration of the video camera to the system is preferably accomplished by determining the viewing angle of the camera (2*a*), then scaling all points projected onto a projection screen having a desired viewing area by a scaling factor $$f = \frac{n}{2d \tan \alpha}$$

where n is the number of pixels in the display window, and d is the distance between the camera lens and the projection screen. In addition, the height of the camera mounted on the car relative to the ground is measured and the height of the viewpoint in the 3D navigation software is changed accordingly.

Figure 8:
FIG. 8 is a graphical representation of a directional arrow shown overlaid with a real time video display screen.

It is contemplated that the driver can also switch between either the display type shown in FIG. 7 or the one in FIG. 8. If the driver has local map data, the driver can also view the map data in the original two dimensional display. Furthermore, additional options for the system include providing to the user the width and altitude data of the road. The altitude data can be provided via a barometric altitude sensor.

In another embodiment of the system 20, the GPS 32 further includes a GPS transmitting means for a wireless transmission of the position, speed and bearing data of the vehicle to the remote access database processing facility 50. The remote access database processing facility 50 further incorporates a receiver for wireless reception of the vehicle position, speed and bearing data, and a transmitting means for a wireless transmission of the map data corresponding to the position, speed and bearing data of the vehicle to the GPS 32. The GPS 32 further includes a GPS receiver for wireless reception of the map data from the remote database processing facility and for downloading the map data to the download port. The wireless transmission and reception of the map data can be performed by using the analog cellular phone, a cellular digital phone, a satellite link, wherein the satellite link includes a Trimble Galaxy system which uses the Inmarsat Satellite system, or a Specialized Mobile Radio system (SMR). The system 20 further includes a wireless data modem, not shown, acting as an interface between the system 20 and a wide area network antenna.

The GPS receiver and radio receiver components may also be integrated into a single unit. The unit may use a wireless radio frequency or infrared (IR) frequency link. The IR frequency link has the advantage that it does not interfere with reception of airwave radio frequency signals used for navigation and does not require testing or certification by the FAA or FCC. This format eliminates the expense, reliability problems, and inconvenience of the cable.

While the present invention has been described in terms of the preferred embodiment, other variations which are within the scope of the invention as outlined in the claims will be apparent to those skilled in the art.

What is claimed is:

1. A navigation system for a mobile vehicle comprising:
   (a) means, responsive to vehicle position data and three dimensional local scene information representative of settings of local environs at various locations, , for producing three dimensional location pertinent information representative of the setting of the local environs at the location indicated by said vehicle position data;
   (b) means for providing direction information;
   (c) means for generating said three dimensional local scene information from two dimensional local scene information; and
   (d) means for visually displaying said three dimensional location pertinent information in connection with said direction information.

2. The vehicle navigation system of claim 1 wherein said visual display means displays said direction information in a three dimensional format.

3. The vehicle navigation system of claim 2 wherein said visual display means displays said three dimensional direction information overlaid on said three dimensional location pertinent information.

4. The navigation system of claim 1 additionally comprising means for providing vehicle position data.

5. The vehicle navigation system of claim 4 wherein said means for providing vehicle position data is a global positioning system receiver.

6. The vehicle navigation system of claim 1 additionally comprising means for obtaining said two dimensional local scene information.

7. The vehicle navigation system of claim 6 wherein said means for obtaining said two dimensional local scene information comprises a receiver for receiving a signal containing said two dimensional local scene information from a remote wireless transmitter.

8. The vehicle navigation system of claim 6 wherein said means for obtaining said two dimensional local scene information comprises:
   (a) local memory for storing said two dimensional local scene information on-board said mobile vehicle; and
   (b) means for accessing said stored two dimensional local scene information.

9. The vehicle navigation system of claim 1 additionally comprising means for producing audible direction information.

10. A navigation system for a mobile vehicle comprising:
    (a) a real environment scene generator adapted to provide:
       (i) three dimensional location pertinent information based upon vehicle position data obtained from a vehicle position data provider and three dimensional local scene information obtained from a local scene information provider; and
       (ii) direction information based upon commands received from an input device;
    (b) a three dimensional graphic renderer, said renderer generating said three dimensional local scene information from two dimensional local scene information; and
    (c) a display, coupled to said real environment scene generator, adapted to visually display said three dimensional location pertinent information in conjunction with said direction information.

11. The vehicle navigation system of claim 10 wherein said direction information is displayed in a three dimensional format.

12. The vehicle navigation system of claim 11 wherein said three dimensional direction information is displayed overlaid on said three dimensional location pertinent information.

13. The vehicle navigation system of claim 10 wherein said vehicle position data provider is a global positioning system receiver.

14. The vehicle navigation system of claim 10 wherein said local scene information provider comprises a receiver for receiving a signal containing said two dimensional local scene information from a remote wireless transmitter.

15. The vehicle navigation system of claim 10 additionally comprising an audible navigation information generator.

16. The vehicle navigation system of claim 10 wherein said local scene information provider comprises local memory for storing said local scene information on-board said mobile vehicle.

17. A method for producing a visual display of navigation information for a mobile vehicle comprising the steps of:
    (a) producing, in response to vehicle position data and three dimensional local scene information representative of settings of local environs at various locations, three dimensional location pertinent information representative of the setting of the local environs at the location indicated by the said vehicle position data;

(b) providing direction information;

(c) generating three dimensional local scene information from two dimensional local scene information; and (d) visually displaying said three dimensional location pertinent information in connection with said direction information.

18. The method of claim 17 wherein step (d) comprises visually displaying said direction information in a three dimensional format.

19. The method of claim 17 wherein step (d) comprises visually displaying said three dimensional direction information overlaid on said three dimensional location pertinent information.

20. The method of claim 17 additionally comprising the step of:

(e) developing vehicle position data.

21. The method of claim 20, wherein step (e) comprises providing vehicle position data using a global positioning system receiver.

22. The method of claim 17 additionally comprising the step of:

(e) obtaining said two dimensional local scene information.

23. The method of claim 22 wherein step (e) comprises obtaining said two dimensional local scene information using a receiver for receiving a signal containing said two dimensional local scene information from a remote wireless transmitter.

24. The method of claim 22 wherein step (e) comprises the steps of:

(f) storing said two dimensional local scene information in local memory on-board said mobile vehicle; and (g) accessing said stored two dimensional local scene information.

25. The method of claim 17 additionally comprising the step of generating audible direction information.

26. The method of claim 17 wherein step (d) comprises visually displaying said three dimensional location pertinent information in connection with said direction information on a cathode ray tube display.

27. A navigation system for a mobile vehicle comprising:

(a) a real environment scene generator;

(b) a vehicle position data generator having an output which is coupled to a first input of said real environment scene generator;

(c) a local scene information provider having an input which is coupled to a first output of said real environment scene generator, and an output which is coupled to a second input of said real environment scene generator;

(d) an input device having an output which is coupled to a third input of said real environment scene generator;

(e) a three dimensional graphic renderer having an output coupled to an input of said local scene information provider, said three dimensional graphic renderer generating three dimensional local scene information from two dimensional local scene information; and (f) a display having an input coupled to a second output of said real environment scene generator, said display adapted to visually display real time three dimensional location pertinent information with direction information received from said real environment scene generator overlaid on said three dimensional location pertinent information, said three dimensional location pertinent information based upon real time vehicle position data received from said vehicle position data generator and real time three dimensional local scene information received from said local scene information provider, and said direction information based upon commands received from said input device.

28. The vehicle navigation system of claim 27 further comprising a source of said two dimensional local scene information, said source comprising a local memory.

29. The vehicle navigation system of claim 27, further comprising a source of said two dimensional local scene information, said source comprising a receiver for receiving a signal containing said two dimensional local scene information.

* * * * *